United States Patent [19]

Overland et al.

[11] Patent Number: 5,021,913

[45] Date of Patent: Jun. 4, 1991

[54] SHUTTER FOR COVERING A WINDOW OPENING IN A CASE THAT CONTAINS A FLEXIBLE DISK

[75] Inventors: Kenneth Overland, Deerfield; Robert Lackowski, Mt. Prospect, both of Ill.

[73] Assignee: Overland Bolling Company, Franklin Park, Ill.

[21] Appl. No.: 342,040

[22] Filed: Apr. 24, 1989

[51] Int. Cl.⁵ .................. G11B 23/033; B65D 85/30
[52] U.S. Cl. .................................. 360/133; 206/444; 369/291
[58] Field of Search .................. 360/133; 206/444; 369/291

[56] References Cited

U.S. PATENT DOCUMENTS

| | | | |
|---|---|---|---|
| 4,589,105 | 5/1986 | Nemoto et al. | 360/133 |
| 4,698,714 | 10/1987 | Sugawara et al. | 206/444 |
| 4,710,839 | 12/1987 | Izuka et al. | 360/133 |
| 4,714,973 | 12/1987 | Kato et al. | 206/444 |
| 4,739,426 | 4/1988 | Muroaka | 360/133 |
| 4,849,844 | 7/1989 | Kato | 360/133 |

OTHER PUBLICATIONS

"ANSI X3.137-1988", American National Standard Institute, Inc. Oct. 1988, pp. 1-28.

*Primary Examiner*—John H. Wolff
*Assistant Examiner*—Craig A. Renner
*Attorney, Agent, or Firm*—Burns, Doane, Swecker & Mathis

[57] ABSTRACT

A shutter for covering the head window opening in a protective case that encases a flexible disk is manufactured from thinner and less expensive material and is made smaller in order to result in significant cost savings. The shutters are manufactured so as to form a band of connected shutters. The band of connected shutters is then wound to form a wound roll of shutters that are not susceptible to damage as a result of repeated contact with other shutters. Adjacent shutters can be connected to one another by strips of connecting material arranged in various manners.

15 Claims, 6 Drawing Sheets

SHUTTER FOR COVERING A WINDOW OPENING IN A CASE THAT CONTAINS A FLEXIBLE DISK

BACKGROUND AND SUMMARY OF THE PRESENT INVENTION

This invention relates to a device for use in a flexible disk cartridge that is adapted to be placed in a disk drive of a computer system and a method of manufacturing the device. More particularly, the present invention concerns a shutter for covering the head window opening in the protective case that contains the flexible disk and a method of manufacturing the shutter.

The three and one-half inch flexible disk cartridge for storing information includes a flexible circular disk having a magnetic coating on both sides and a case that surrounds and encloses the disk. The case has two oppositely positioned head window openings through which the flexible disk is exposed. In order to cover the head window openings and thereby protect the flexible disk when the cartridge is not positioned in the disk drive, a spring biased shutter is provided.

The American National Standards Institute, Inc. has published a standard that has been agreed upon by a majority of those individuals having a direct and materially affected interest in the three and one-half inch flexible disk cartridge. The standard is referred to as American National Standard X3.137-1988 and is incorporated herein by reference.

The aforementioned standard sets forth specifications regarding the dimensions of the case, the materials from which the various parts of the flexible disk cartridge should be manufactured as well as the physical and other relevant properties that the various parts should possess.

The use of the three and one-half inch flexible disk cartridge has become quite widespread and consequently the number of flexible disk cartridges manufactured and sold is very large. The manufacture and sale of shutters for use in the flexible disk cartridge has experienced a similar growth. In view of the large number of shutters that are manufactured and sold, it can be readily seen that any cost savings attributable to the manufacture of each individual shutter will result in a very large overall cost savings.

Similarly, since the shutter accounts for a significant portion of the total cost associated with the manufacture of the flexible disk cartridge, any cost savings associated with the manufacture of each individual shutter will result in lower costs for the manufacture of the flexible disk cartridge as a whole. Those cost savings may, in turn, be passed on to the consumer so that the cost of purchasing a flexible disk cartridge is reduced.

From the foregoing discussion, it is apparent that it would be highly desirable to manufacture shutters by using less material and/or less expensive material. The manufacture of thinner shutters or smaller shutters would permit the aforementioned objectives to be achieved by significantly reducing the material costs. Similarly, the use of different materials that are less expensive than those commonly used would result in substantial savings in material costs.

Another concern that arises in the manufacture of shutters for use in the three and one-half inch flexible disk cartridge concerns the manner in which the shutters are packaged after they have been manufactured. Typically, the shutters are formed by passing a sheet of material through a stamping die and subjecting the sheet of material to repeated stamping or punching operations. The stamping or punching operations result in the manufacture of individual shutters which are then packaged in containers for shipment to the customers.

A problem arises in such a manufacturing and packaging process in that the individual shutters are free to contact each other in the container in which they are packaged. The shutters are subjected to repeated jostling and contact with each other throughout the package handling and shipping stages and that can result in damage to the shutters. In particular, the precision formed edges of the shutters can be damaged as a result of the continuous contact between the shutters in the container. Further, any coating that may be located on the shutters for protective or performance purposes can be easily damaged through repeated contact with other shutters. The damage suffered by the shutters as a result of the aforementioned manufacturing and packaging process may adversely affect the performance of the shutter and in some cases, may necessitate that the shutters be discarded.

It can be seen, therefore, that there exists a need for a different process for manufacturing and packaging the shutters in order to avoid the problems associated with the process currently used.

The aforementioned problems are overcome and the foregoing objectives are achieved by the shutter and the method for manufacturing the shutter in accordance with the present invention. The shutter includes a piece of material having first and second substantially rectangular portions and an intermediate portion that connects the first and second portions to one another. The first and second portions each have two substantially parallel first sides and two substantially parallel second sides. The first sides of the first and second portions are longer than the second sides of the first and second portions. The first and second portions each have a substantially rectangular opening located therein that is defined by two substantially parallel first sides and two substantially parallel second sides. The two first sides in each opening are longer than the two second sides and the two first sides in each opening are substantially parallel to the second sides of the first and second portions. One of the first sides of the opening in the first portion and one of the first sides of the opening in the second portion are coplanar and the other first side of the opening in the first portion and the other first side of the opening in the second portion are coplanar. The distance between the second sides of the first and second portions in a direction perpendicular to the second sides is equal to or less than 1.630 inches. Further, the thickness of the shutter is equal to or less than 0.007 inches. The shutter can be manufactured from stainless steel, plated brass, pre-plated steel, aluminum or copper-based material.

In another embodiment of the present invention, the shutter includes an outwardly extending flange that is integrally connected to a second side of the intermediate portion and a substantially L-shaped tab that is integrally connected to the flange. One end of a spring member is adapted to be positioned between the flange and the L-shaped tab in order to seat the spring member and thereby bias the shutter in the closed position.

According to another aspect of the present invention, the shutters are arranged in a wound roll. Each of the shutters includes a piece of material having first and second substantially rectangular portions and an intermediate portion that connects the first and second portions to one another. The first and second portions each have two substantially parallel first sides and two substantially parallel second sides. The first sides of the first and second portions are longer than the second sides of the first and second portions. The first and second portions each have a substantially rectangular opening located therein that is defined by two substantially parallel first sides and two substantially parallel second sides. The two first sides in each opening are longer than the two second sides and the two first sides of each opening are substantially parallel to the second sides of the first and second portions. One of the first sides of the opening in the first portion and one of the first sides of the opening in the second portion are coplanar and the other first side of the opening in the first portion and the other first side of the opening in the second portion are coplanar. Additionally, a connecting arrangement is provided for connecting adjacent ones of the shutters.

In one embodiment, the first and second portions of each shutter are substantially parallel and lie in different planes and the connecting arrangement includes a strip of material that connects the intermediate portions of adjacent shutters. In another embodiment, the first and second portions of each shutter are substantially parallel and lie in different planes and the connecting arrangement includes a plurality of strips of material that connect one of the first sides of the first portion of one shutter to one of the first sides of the first portion of an adjacent shutter. In a further embodiment of the present invention, the first and second portions of each shutter are partially folded and the connecting arrangement includes a strip of connecting material that extends between adjacent shutters. In a still further embodiment, the first and second portions of each shutter are coplanar and the connecting arrangement includes a strip of material that connects one of the second sides of the first portion of one shutter to one of the second sides of the first portion of an adjacent shutter and a strip of material that connects one of the second sides of the second portion of the one shutter to one of the second sides of the second portion of the adjacent shutter.

According to a further aspect of the present invention, a method of manufacturing the shutters includes feeding a sheet of material to a stamping die and punching the sheet of material with the die to form a plurality of connected shutters such that the shutters include first and second substantially rectangular portions and an intermediate portion that connects the first and second portions to one another. The first and second portions each have two substantially parallel first sides and two substantially parallel second sides. The first sides of the first and second portions are longer than the second sides of the first and second portions. The first and second portions each have a substantially rectangular opening located therein that is defined by two substantially parallel first sides and two substantially parallel second sides. The two first sides in each opening are longer than the two second sides and the two first sides of each opening are substantially parallel to the second sides of the first and second portions. One of the first sides of the opening in the first portion is coplanar with one of the first sides in the second portion and the other first side of the opening in the first portion is coplanar with the other first side in the second portion. The method further includes the step of winding the connected shutters into a roll.

BRIEF DESCRIPTION OF THE DRAWINGS

Preferred embodiments of the present invention will be described in greater detail with reference to the accompanying drawings, wherein like elements bear like reference numerals and wherein.

DETAILED DESCRIPTION OF THE PREFERRED EMBODIMENT

Figure 1:
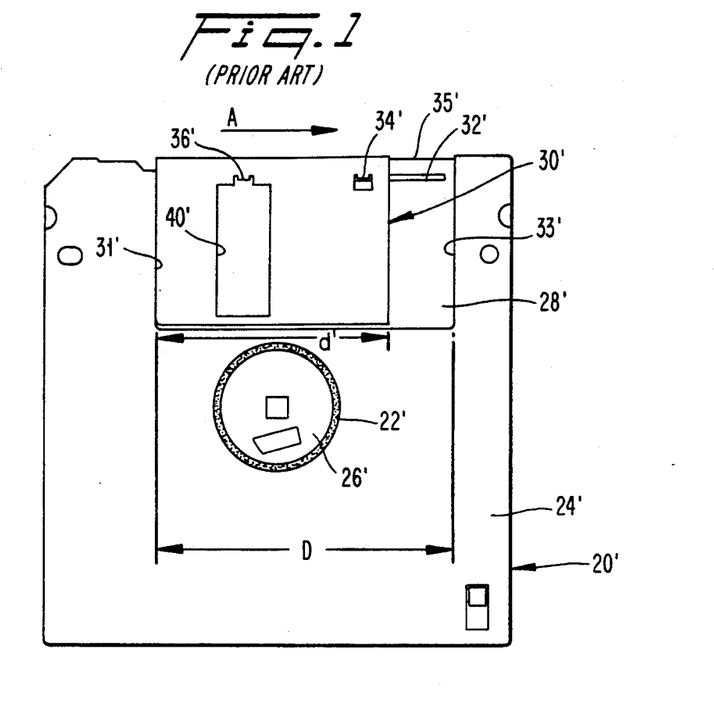
FIG. 1 is a front view of a prior art flexible disk cartridge with the shutter in its normally closed position.

FIG. 1 shows a prior art three and one-half inch cartridge 20' for use in the disk drive of a computer system. The cartridge 20' includes a circular disk 22' having a magnetic coating on both sides and a protective case 24' that encases the disk 22'. The circular disk 22' is sometimes referred to as the cookie. A centrally located hub 26' is attached to the disk 22'. The hub 26' permits rotary motion to be imparted to the disk 22'. A shutter 30' is slidably positioned in a recessed portion 28' of the case 24'. The shutter 30' includes an opening 40' through which the disk 22' can be exposed when the shutter is moved in the direction of the arrow A. The recessed portion 28' includes a guide slot 32' into which two inwardly extending tabs 34', 36' on the shutter 30' are positioned. The guide slot 32' guides the shutter 30' when the shutter is moved in the direction of arrow A. The phrase "flexible disk cartridge" as used in the application is meant to refer to the protective case, the flexible disk and the shutter.

Figure 2:
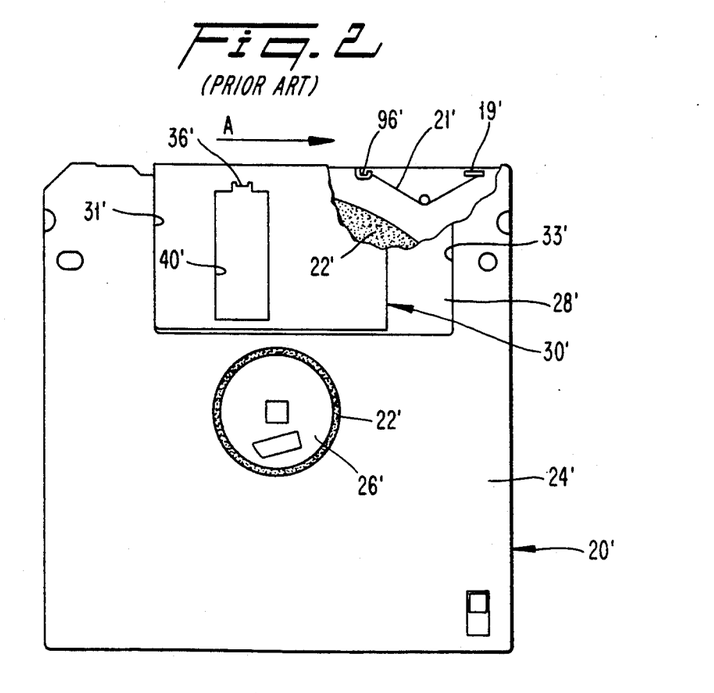
FIG. 2 is a front view of a prior art flexible disk cartridge similar to FIG. 1 showing, in partially broken away section, the coil spring that biases the shutter to its closed position.

As seen in FIG. 2, the shutter 30' is normally biased to the left by a coil spring 21' located in the case 24. One end of the coil spring 21' is positioned in a slot 19' that is located on the inner face of the case 24'. The other end of the coil spring 21' is positioned on a tab 96' that extends downwardly from an inner surface of the shutter 30'. The shutter 30' is thus biased in the leftward direction as a result of the force of the coil spring 21', and the left edge 31' of the recessed portion 28' serves as a stop for limiting the leftward movement of the shutter 30'. The coil spring 21' is positioned within the protective case 24' in such a manner that it does not contact the disk 22'.

Figure 3:
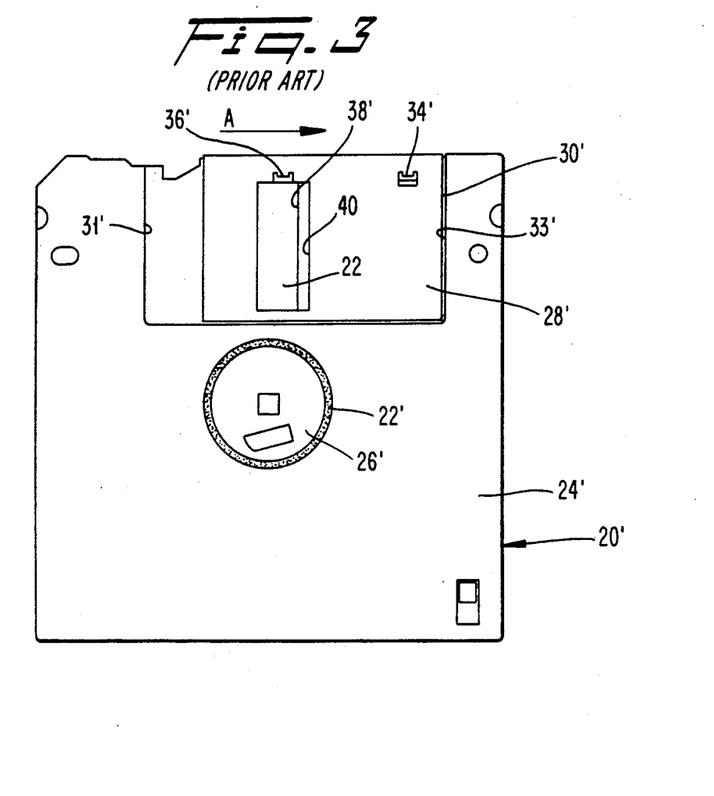
FIG. 3 is a front view of a prior art flexible disk cartridge showing the shutter moved to the open position.

When the cartridge 20' is positioned in a disk drive (not shown), the shutter 30' is forced to move in the direction of the arrow A. The resulting position of the shutter 30' is shown in FIG. 3. When the shutter 30' is moved in the direction of the arrow A, the opening 40' in the shutter 30' aligns with a head window opening 38' in the case 24' so that the disk 22' is exposed for retrieval of information located on the disk 22'. When the cartridge 20' is removed from the disk drive, the shutter 30' returns to its normally closed position shown in FIG. 1 by the force of the coil spring 21' located inside the case 24'. Thus, the opening 40' in the shutter moves out of alignment with the head window opening 38' in the case 24' and in that way, the disk 22' is covered and protected.

Referring again to FIG. 1, the dimension d' of the prior art shutter 30' is typically 1.870 inches. The dimension D' of the recessed portion 28' is correspondingly dimensioned so that when the shutter 30' is biased against the left edge 31' of the recessed portion 28', the opening 40' is out of alignment with the window opening 38' and when the shutter 30' is slid to the right and abuts against the right edge 33' of the recessed portion 28', the opening 40' is in alignment with the window opening 38'.

While the prior art shutter 30' described above is suitable for its intended purpose, the present inventors have recognized that a smaller and thinner shutter can be employed so as to result in significant material cost savings. Except for minor modifications, such a smaller and thinner shutter could be used in conjunction with the protective cases currently being used.

Figure 4:
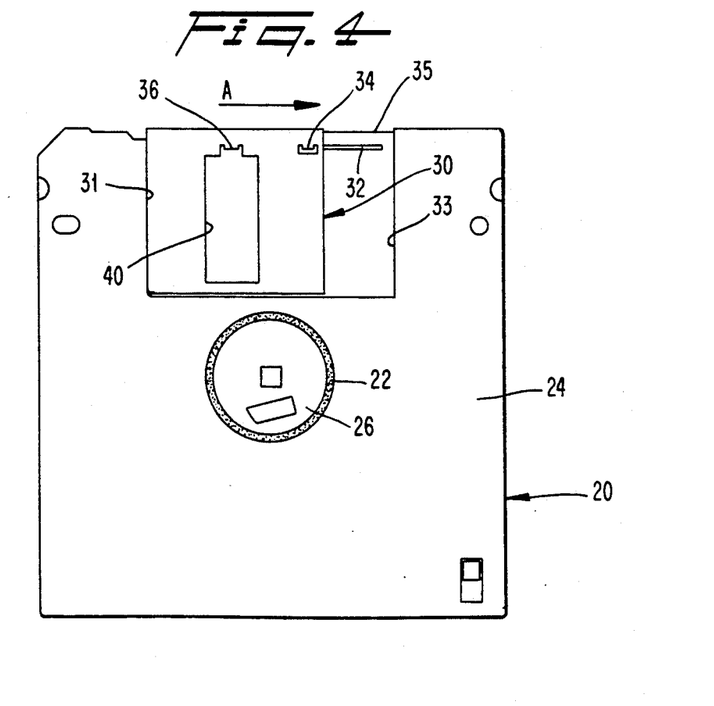
FIG. 4 is a front view of a flexible disk cartridge according to the present invention with the shutter in its normally closed position.

The flexible disk cartridge according to the present invention is illustrated in FIG. 4. The flexible disk cartridge 20 includes a circular disk 22 for storing information and a protective case 24 that encases the disk 22. A centrally located hub 26 is attached to the disk 22 and permits rotary motion to be imparted to the disk 22. A shutter 30 is slidably positioned in a recessed portion 28 of the protective case 24. An opening 40 is located in the shutter 30 so that when the shutter 30 is slid in the direction of the arrow A, the disk 22 can be exposed through the window 40. A guide slot 32 is positioned in the recessed portion 28. Two inwardly extending tabs 34, 36 that are integrally connected to the shutter fit into the guide slot 32 in order to guide the back and forth movement of the shutter 30.

The shutter 30 is normally biased in the position shown in FIG. 4 by a suitable conventional coil spring (not shown) located in the interior of the protective case 24. The shutter 30 moves in the direction of the arrow A against the biasing force of the spring when the cartridge 20 is inserted into a suitable conventional disk drive (not shown). In a manner similar to that noted above, the opening 40 aligns with a head window opening (not shown) in the case 24 so that the disk 22 is exposed for retrieval of information located on the disk.

Figures 5, 6, 7, 8, 9:
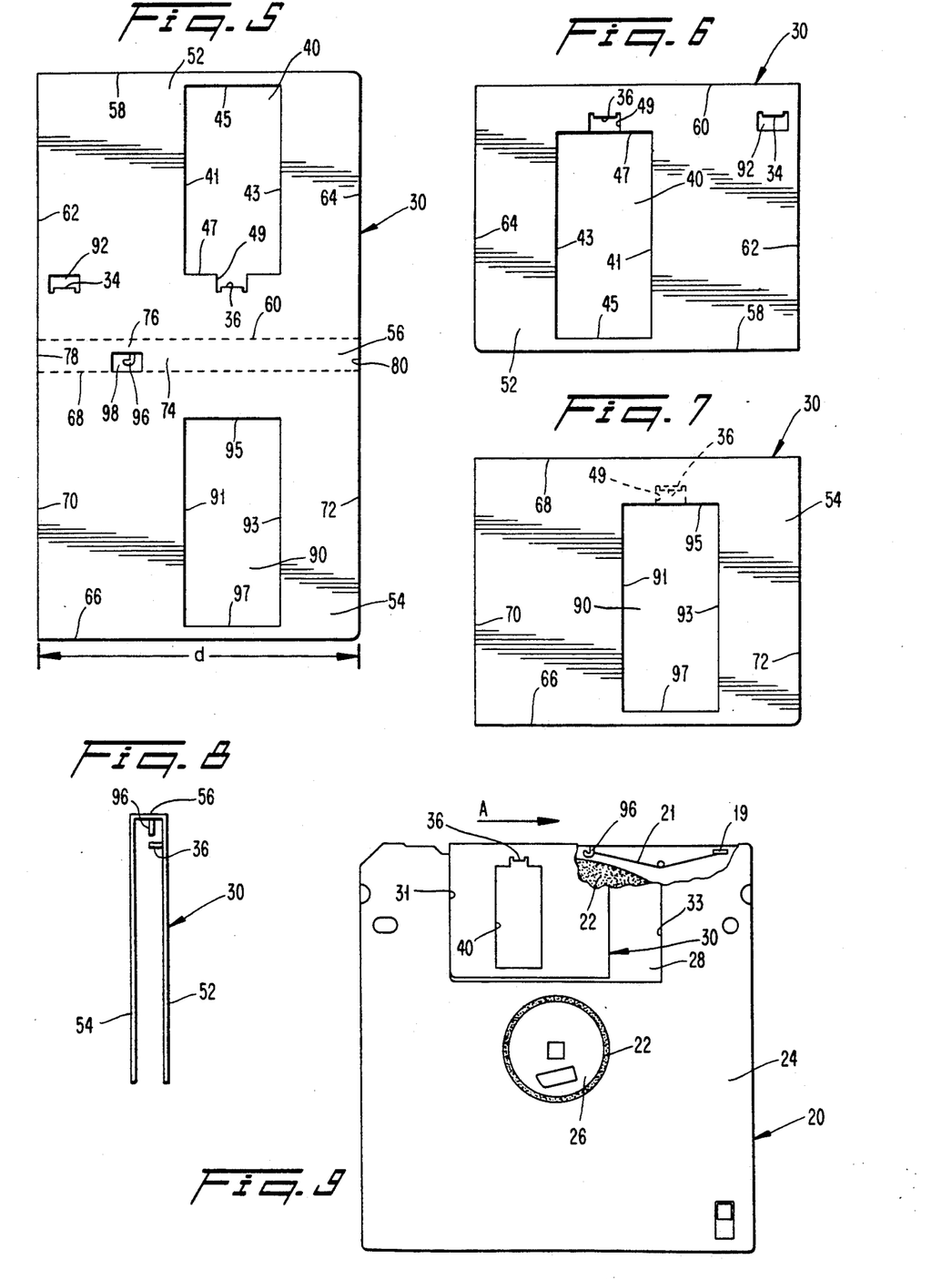
FIG. 5 is an enlarged top view of the shutter according to the present invention in flat configuration.
FIG. 6 is an enlarged rear view of the shutter in the folded configuration.
FIG. 7 is an enlarged front view of the shutter in the folded configuration.
FIG. 8 is an enlarged right side view of the shutter in the folded configuration.
FIG. 9 is a front view of a flexible disk cartridge with the shutter according to the present invention in the closed position.

The shutter 30 according to the present invention is shown in FIGS. 5-8. Turning initially to FIG. 8, the shutter 30 is substantially U-shaped and includes a first portion 52, a second portion 54 and an intermediate portion 56 that connects the first portion 52 to the second portion 54.

The shutter 30 is shown in more detail in FIG. 5 where the shutter is illustrated in flat configuration. As seen in FIG. 5, the first portion 52 is substantially rectangular and includes two substantially parallel first sides 58, 60 and two substantially parallel second sides 62, 64. The two first sides 58, 60 are longer than the two second sides 62, 64.

The second portion 54 is substantially rectangular and includes two generally parallel first sides 66, 68 and two generally parallel second sides 70, 72. The two first sides 66, 68 are longer than the two second sides 70, 72. The size of the first portion 52 is substantially the same as the size of the second portion 54.

The intermediate portion 56 is generally rectangular and includes two substantially parallel first sides 74, 76 that are longer than two substantially parallel second sides 78, 80. One of the first sides 76 of the intermediate portion 56 is connected to one of the first sides 60 of the first portion 52 while the other first side 74 of the intermediate portion 56 is connected to one of the first sides 68 of the second portion 54. The first sides 58, 60 of the first portion 52 are generally parallel to the first sides 66, 68 of the second portion 54 and the first sides 74, 76 of the intermediate portion 56. Similarly, the second sides 62, 64 of the first portion 52 are substantially parallel to the second sides 70, 72 of the second portion 54 and the second sides 78, 80 of the intermediate portion 56.

The first portion 52 has a substantially rectangular opening 40 located therein. The opening 40 is defined by two substantially parallel first sides 41, 43 and two substantially parallel second sides 45, 47. The two first sides 41, 43 are generally parallel to the second sides 62, 64 of the first portion 52 and the two second sides 45, 47 are substantially parallel to the first sides 58, 60 of the first portion. Further, the first sides 41, 43 of the opening 40 are longer than the second sides 45, 57 of the opening 40. As can be seen from FIG. 5, the opening 40 is located closer to one of the second sides 64 of the first portion 52 than the other second side 62 and is located closer to one of the first sides 58 of the first portion 52 than the other first side 60.

The second side 47 of the opening 40 that is located closest to the intermediate portion 56 has a notched area 49 and a tab 36 extending from the notched area 49. The function of the tab 36 will be explained below.

Also included in the first portion 52 is a rectangular opening 92. The side of the opening 92 that is located closest to the intermediate portion 56 has a tab 34 extending therefrom. The purpose of the tab 34 will become apparent from the discussion below. The tab 34 is preferably the same length as the tab 36.

The second portion 54 has an opening 90 located therein that is defined by two substantially parallel first sides 91, 93 and two substantially parallel second sides 95, 97. The first sides 91, 93 are longer than the second sides 95, 97 and are substantially parallel to the second sides 70, 72 of the second portion 54. The second sides 95, 97 of the opening 90 are substantially parallel to the first sides 66, 68 of the second portion 54. The opening 90 in the second portion 54 is located closer to one of the second sides 72 of the second portion 54 than the other second side 70 and is located closer to one of the first sides 66 of the second portion 54 than the other first side 68.

The opening 40 in the first portion 52 is positioned with respect to the opening 90 in the second portion 54 such that the first sides 41, 43 of the opening 40 are parallel to the first sides 91, 93 of the opening 90. The first side 41 of the opening 40 and the first side 91 of the opening 90 are coplanar while the first side 43 of the opening 40 and the first side 93 of the opening 90 are coplanar. Also, the second side 45 of the opening 40 is spaced from the first side 58 of the first portion 52 the same distance that the second side 97 of the opening 90 is spaced from the first side 66 of the second portion 54. Further, the size of the opening 40, excluding the notched area 49, is substantially the same as the size of the opening 90.

The intermediate portion 56 has an opening 98 located therein that is positioned closer to one of the second sides 78 of the intermediate portion than the other second side 80. As can be seen from FIG. 5, the opening 98 abuts the first side 74 of the intermediate portion 50 that is connected to the second portion 54. An L-shaped tab 96 extends from the side of the opening 98 that is located closest to the first portion 52. The function of the L-shaped tab 96 will become apparent later.

While the various features of the shutter 30 have been illustrated with reference to FIG. 5 which shows the shutter 30 in flat configuration, it is to be understood that prior to attaching the shutter 30 to the case 24 as seen in FIG. 4, certain other manufacturing steps must be carried out with respect to the shutter 30. In particular the tab 34, the tab 36 and the tab 96 must be bent inwardly, (i.e., into the plane of the paper as seen in FIG. 5) and the shutter 30 must be folded inwardly (i.e., into the plane of the paper as seen in FIG. 5) so that the first and second portions 52, 54 are substantially parallel to one another and substantially perpendicular to the intermediate portion 56. The shutter 30 resulting from those manufacturing steps is depicted in FIG. 8.

As can be seen from FIG. 8, the L-shaped tab 96 extends downwardly into the interior of the U-shaped shutter 30. The tabs 34, 36 also extend substantially the same distance inwardly into the interior of the U-shaped shutter 30. The L-shaped tab 96 is positioned slightly closer to the first portion 52 than the second portion 54.

FIG. 6 shows the rear side of the shutter 30 after the shutter has been folded and after the tabs 34, 36 and 96 have been pushed inwardly toward the interior of the U-shaped shutter 30. The tabs 34, 36 are positioned such that when they are pressed inwardly, they are aligned in a common plane that is parallel to the first sides 58, 60 of the first portion 52.

FIG. 7 illustrates the front side of the shutter and shows the various features associated with the second portion 54.

Turning once again to FIG. 4, once the manufacture of the shutter 30 is complete as depicted in FIGS. 6-8, the shutter 30 is placed on the protective case 24 of the flexible disk cartridge 20. The shutter 30 is placed on the case 24 so that the second portion 54 of the shutter 30 is positioned on the front face of case 24 while the first portion 52 of the shutter 30 is positioned on the rear face of the case 24. In that way, the intermediate portion 56 of the shutter 30 rides along the top edge 35 of the case 24. The parallel and aligned, inwardly extending tabs 34, 36 are positioned in the guide slot 32 of the case 24 in order to guide the shutter 30 in the manner previously described as the shutter 30 moves back and forth in the recessed area 28. The inwardly extending L-shaped tab 96 is attached to a coil spring (not shown in FIG. 4) located in the interior of the case 24 in a manner similar to that depicted in FIG. 2. The coil spring applies a biasing force to the shutter 30 that tends to maintain the shutter 30 in the closed position shown in FIG. 4 when the shutter 30 is not positioned in a disk drive. As described previously, the shutter 30, when in the position shown in FIG. 4, covers the head window opening 38 in the case 24 and thus, protects the disk 22 which is exposed through the head window opening 38. Upon insertion into a disk drive, the shutter slides in the direction of the arrow A in order to align the openings 40, 90 in the first and second portions 52, 54 with the head window opening 38. At that time, information can be stored on or retrieved from the disk 22.

The shutter 30 according to the present invention is smaller in size and thickness than prior art shutters. Referring to FIG. 5, the dimension d of the shutter 30 is substantially smaller than the corresponding dimension d' of the prior art shutter illustrated in FIG. 1. The dimension d of the shutter according to the present invention is between 1.200 inches and 1.630 inches and preferably, is approximately 1.530 inches. The thickness of the shutter is between 0.005 inches and 0.007 inches and preferably, is approximately 0.006 inches.

Since the shutter 30 according to the present invention is smaller and thinner than prior art shutters, less material is required to manufacture the shutter. The savings in material costs associated with the thinner and smaller shutters of the present invention, when considered in light of the manufacture of very large numbers of shutters, results in substantial cost savings.

Referring once again to FIG. 4, it can be readily seen from an understanding of the way in which the shutter 30 operates that in order to accommodate the smaller shutter 30, the right edge 33 of the recessed portion 28 must be moved to the left so that the shutter 30 can properly function. The right edge 33 of the recessed portion 28 serves as a stop for the shutter 30 so that when the shutter 30 is inserted into a disk drive, the shutter 30 will move only so far as is necessary to align the windows 40, 90 in the shutter 30 with the head window opening in the case 24. Since the shutter 30 according to the present invention is smaller in the direction parallel to the sliding direction A of the shutter, it will be necessary to move the right edge 33 of the recessed portion 28 of the case 24 to the left. Thus, in comparison to the recessed portio 28' in the prior art protective case 24', the recessed portion 28 in the case 24 of the present invention will be smaller as a result of the fact that the right edge 33 has been moved to the left.

It will also be understood that the tab 34 and the tab 96 in the shutter 30 according to the present invention will have to be moved closer to the tab 36 as a result of the reduced size of the shutter 30.

The present inventors have recognized that as a result of the smaller shutter 30, it may be more beneficial to employ a different type of spring for biasing the shutter 30 to the closed position. Also, in combination with that different spring, the present inventors have discovered that a different type of tab for engaging the such a spring may be more useful.

Turning to FIG. 9 which shows the coil spring 21 attached to the smaller shutter 30 of the present invention, the present inventors have found that two problems may arise when such a coil spring 21 is used to bias the smaller shutter 30 to the closed position. First, the present inventors have discovered that a coil spring 21 such as that shown in FIG. 9, may not be able to provide a sufficient biasing force for ensuring that the smaller shutter 30 is pushed against the left edge 31 of the recessed portion 28. The inability of the coil spring to bias the shutter 30 to the closed position (i.e., against the left edge 31 of the recessed portion 28) may result from the fact that the tab 96 which is engaged by one end of the coil spring is located farther away from the slot 19 which is engaged by the other end of the coil spring. Thus it may be necessary to employ a larger coil spring than that used in the prior art flexible disk cartridge in order to ensure that a large enough biasing force is applied to the shutter. Whether or not a larger coil spring will be needed will depend upon the biasing capability of the coil spring and the distance between the tab 96 and the slot 19 (which is, of course, dependent upon the amount by which the size of the shutter is reduced).

The second potential problem recognized by the present inventors as a result of the smaller shutter 30 is that if a larger coil spring is utilized, the coil spring may interfere with the disk 22. It can be seen that if a larger coil spring is utilized, when the shutter 30 is pushed in the direction of the arrow A upon insertion into a disk drive, the coil portion of the spring will tend to move downward toward the flexible disk 22 and may actually contact the disk 22. Such contact can, of course, be harmful to the flexible disk 22.

In recognition of those two problems, the present inventors have designed a different spring arrangement for overcoming those problems. Further, the present inventors have designed the shutter to most effectively accommodate that new spring arrangement.

Figure 10:
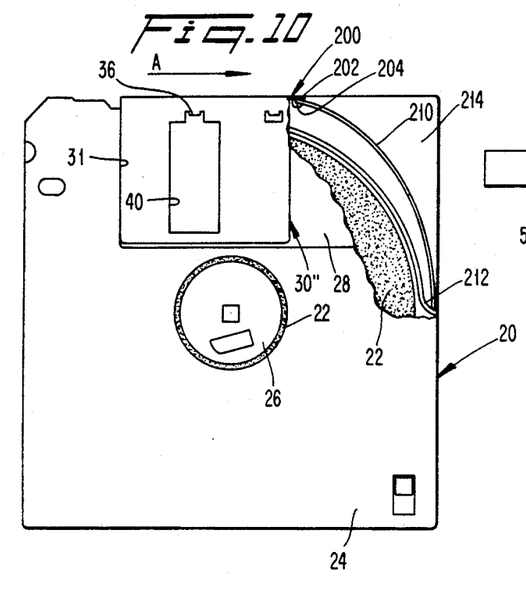
FIG. 10 is a front view of a flexible disk cartridge with the shutter according to another embodiment of the present invention in the closed position and showing, in partially broken away section, the spring member that biases the shutter in the closed position.

Referring initially to FIG. 10 which shows the smaller shutter 30" of the present invention mounted on the protective case 24, the shutter 30" is attached to the protective case 24 in the same manner as noted above with respect to FIG. 4. In place of the tab 96 described above with respect to FIGS. 4-9, the embodiment illustrated in FIG. 10 includes an arrangement 200 for seating a spring member 210. The spring member 210 consists of a piece of elongated spring material that is positioned between the arrangement 200 and a somewhat V-shaped groove 212 formed on the inner face 214 of the protective case 24.

Figure 15:
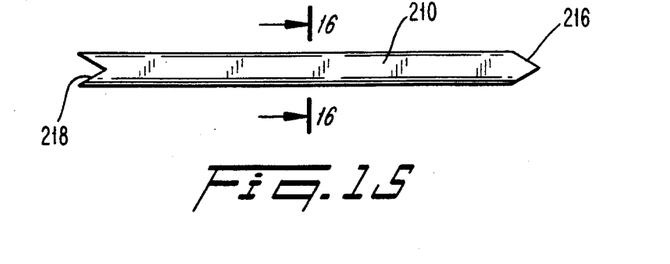
FIG. 15 is an enlarged top view of the spring member shown in FIG. 10.

As shown in more detail in FIG. 15, the spring member 210 includes a pointed V-shaped end 216 and an oppositely positioned indented V-shape end 218.

Figure 16:
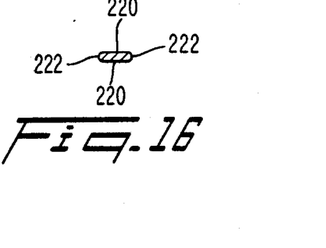
FIG. 16 is a cross-sectional view along the line 16—16 in FIG. 15.

As illustrated in FIG. 16, the cross-section of the spring member 210 has two flat faces 220 and two rounded edges 222. The width of the spring member 210 can be approximately 0.060 inches while the thickness of the spring member may be approximately 0.008 inches. The length of the spring member 210 will depend upon the positioning of the somewaht V-shaped groove 212 on the inner face 214 of the protective case as well as the size of the shutter 30" and the resultant position of the arrangement 200. In any event, the length of the spring member 210 must be such that when the spring member 210 is seated between the somewhat V-shaped groove 212 on the inner face 214 of the case 24 and the arrangement 200 extending from the shutter 30", a biasing force is applied to the shutter 30" that is sufficient to push the shutter 30" against the left edge 31 of the recessed portion 28.

The pointed V-shaped end 216 of the spring member 210 serves two useful functions. First, the pointed end 216 permits the spring member 210 to be easily inserted into the protective case 24 during assembly of the flexible disk cartridge 20. Second, the pointed end 216 permits the spring member 210 to be easily seated in the somewhat V-shaped groove 212 on the inner face 214 of the protective case 24.

Figure 13:
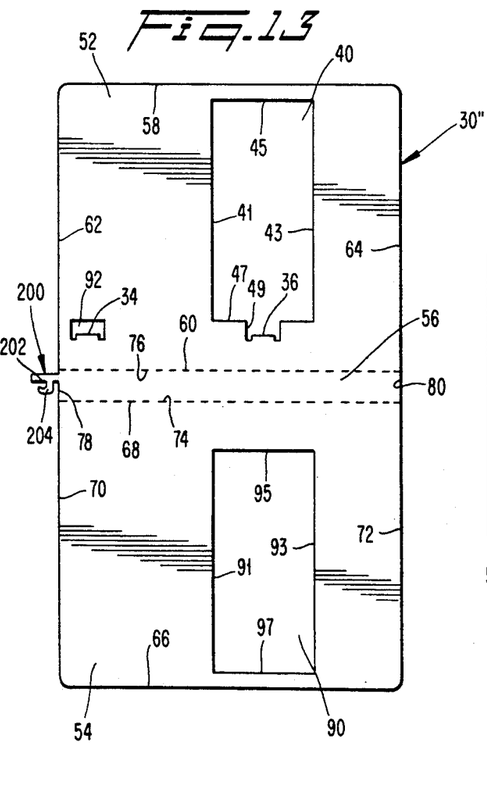
FIG. 13 is an enlarged top view of the shutter shown in FIG. 10 in flat configuration.

Reference is now made to FIG. 13 which shows the shutter 30" in more detail. Except for the arrangement 200 for seating the spring member 210 and the absence of the tab 96, all of the parts of the shutter 30" are similar to the parts of the shutter 30 depicted in FIGS. 5-8 and thus, a description of those parts will not be repeated here. The shutter 30" is illustrated in a flat configuration in FIG. 13. The arrangement 200 for seating the indented V-shaped notched end 218 of the spring member 210 includes an outwardly extending flange member 202 that is connected to the second side 78 of the intermediate portion 56. Integrally connected to the flange member 202 is somewhat L-shaped tab 204.

Figure 14:
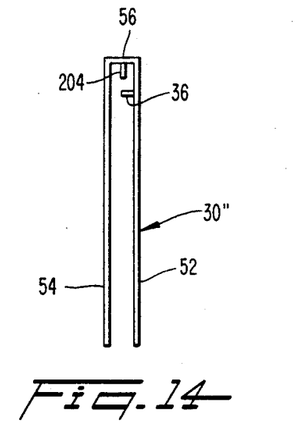
FIG. 14 is an enlarged right side view of the shutter shown in FIG. 10 in the folded configuration.

After the shutter 30" is manufactured in the flat configuration illustrated in FIG. 13, the shutter 30" is then folded inwardly (i.e., into the plane of the paper as seen in FIG. 13). Thereafter, the tab 204 is pushed downwardly so that the tab 204 is approximately perpendicular to the flange 202. The resulting configuration of the shutter 30" is illustrated in FIG. 14.

Figure 11:
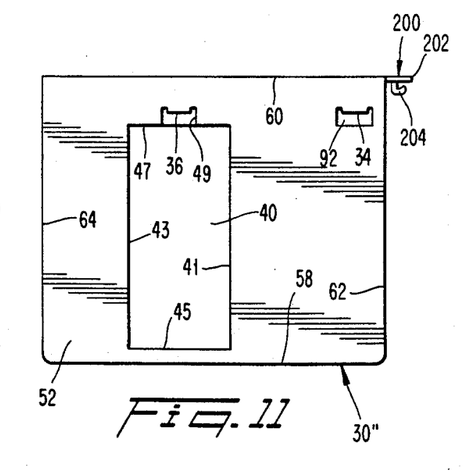
FIG. 11 is an enlarged rear view of the shutter shown in FIG. 10 in the folded configuration.
Figure 12:
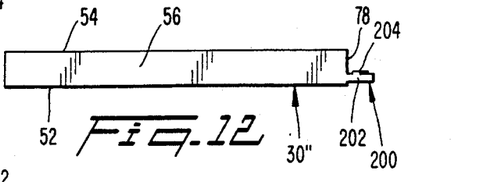
FIG. 12 is an enlarged top view of the shutter shown in FIG. 10 in the folded configuration.

As can be seen from FIG. 11, after the shutter 30" has been folded and the tab 204 has been pushed downwardly, the flange 202 extends outwardly from the second side 78 of the intermediate portion 56, is substantially perpendicular to the second side 62 of the first portion 52 and is substantially coplanar with the intermediate portion 56.

Referring to FIG. 11, the flange 202 is located closer to the first portion 52 of the shutter 30" than to the second portion 54.

The combination of the outwardly extending flange 202 and the downwardly extending L-shaped tab 204 provides an ideal seat for the inwardly extending V-shape notch 218 of the spring member 210. When the shutter 30" is mounted on the protective case 24 in the manner shown in FIG. 10, the pointed V-shaped end of the spring member 210 can be positioned in the somewhat V-shaped groove 212 on the inner face 214 of the protective case 24 and the inwardly extending V-shaped notch 218 at the other end of the spring member 210 can be seated between the flange 202 and the tab 204 exrtending from the shutter 30". That arrangement overcomes the aforementioned problems that may result from the use of a coil spring in conjunction with the smaller shutter 30". The spring member 210 tends to bow outwardly, away from the disk 22, when it is positioned between the groove 212 and the flange 202 and tab 204 arrangement as shown in FIG. 10. Thus, when the shutter 30" is slid in the direction of the arrow A upon being inserted into a disk drive, the spring member 210 will tend to bow outwardly, away from the disk 22. The possibility that the disk 22 will become damaged is, therefore, substantially eliminated.

It should be understood that although the spring member 210 has been described as having the configuration shown in FIGS. 15 and 16, other confrontations are possible so long as the objective of providing a sufficient biasing force to the shutter while not raising the possibility that the flexible disk and the information stored thereon will become damaged is acheived.

Although the shutter 30, 30" according to both aspects of the present invention can be manufactured from stainless steel, further cost savings can be realized by manufacturing the shutters from less expensive materials. Examples of such materials include plated brass, pre-plated steel, copper based material and aluminum.

The shutters 30 according to the first embodiment of the present invention are manufactured in a way that prevents the shutters from becoming damaging during packaging, handling and shipping. Initially a sheet of material is fed to a stamping or punching die. The sheet is subjected to repeated stampings in order to result in a plurality of shutters having the configuraton illustrated in FIG. 5. During the stamping process though, the shutters are stamped in such a way that when the shutters exit the die, they are connected together.

Figure 17:
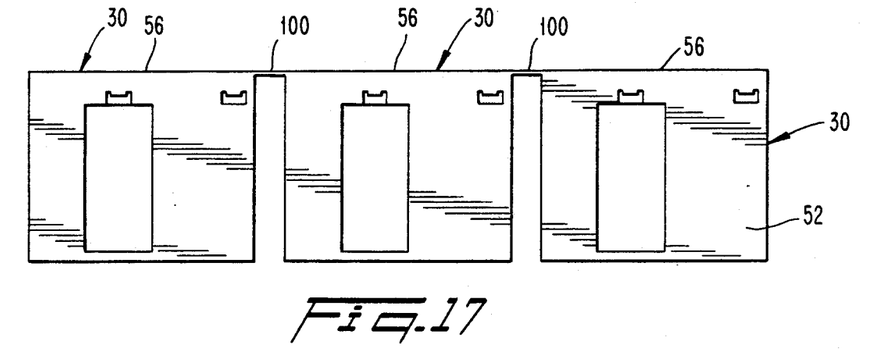
FIG. 17 is a top view of a strip of connected shutters after manufacturing according to one embodiment of the present invention.
Figure 18:
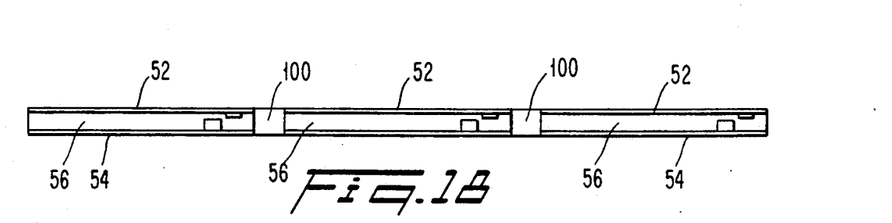
FIG. 18 is a bottom view of the strip of connected shutters according to the embodiment illustrated in FIG. 17.

In a first embodiment shown in FIG. 17, the shutters 30 are stamped in the die so that when the shutters exit the die, the shutters 30 are folded in the manner depicted in FIG. 8 and adjacent shutters are connected together by a strip 100 of connecting material. As seen in FIG. 18, the strip 100 of connecting material connects one of the second sides 80 of the intermediate portion 56 of one shutter 30 to one of the second sides 78 of the intermediate portion 56 of an adjacent shutter 30. The band of connected shutters 30 shown in FIGS. 17 and 18 is then transversely wound on a suitable reel so that the intermediate portions 56 of the shutters rest against the reel. The resulting wound roll of connected shutters can then be packaged for shipping.

Figure 19:
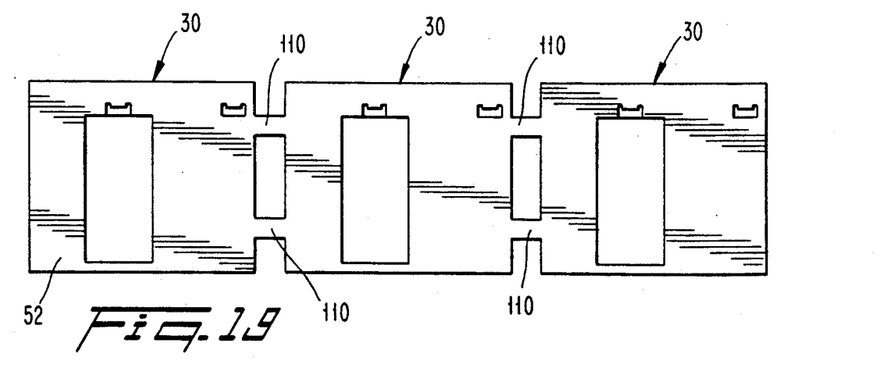
FIG. 19 is a top view of a strip of connected shutters after manufacturing according to another embodiment of the present invention.
Figure 20:
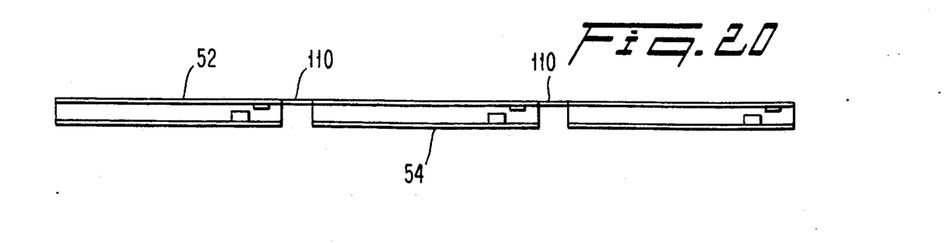
FIG. 20 is a bottom view of the strip of connected shutters according to the embodiment illustrated in FIG. 19.

In another embodiment illustrated in FIG. 19, the shutters 30 are stamped in the die such that when they exit the die, the shutters are folded in the manner shown in FIG. 8 and adjacent shutters 30 are connected together by a plurality of strips 110 of connecting material. As illustrated in FIG. 20, the two strips 110 of connecting material connect one of the second sides 62 of the first portion 52 of one shutter 30 to one of the second sides 64 of the first portion 52 of an adjacent shutter 30. It is to be understood that the strips 110 of connecting material could, alternatively, connect one of the second sides 70 of the second portion 54 of one shutter 30 to one of the second sides 72 of the second portion 54 of an adjacent shutter. Also, more than two strips 110 of connecting material could be utilized, if desired, for connecting adjacent shutters.

The band of connected shutters 30 according to the embodiment illustrated in FIGS. 19 and 20 are then coil wound to produce a wound roll of shutters. Sheets of paper or other protective material may be placed between adjacent layers of the shutters in the roll in order to avoid direct contact between the shutters. After winding the band of connected shutters 30, the wound roll may be appropriately packaged for shipping.

Figure 21:
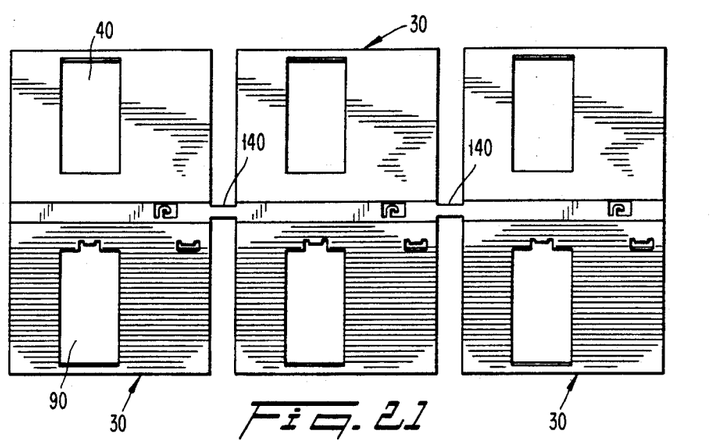
FIG. 21 is a top view of a strip of connected shutters after manufacturing according to another of the present invention.
Figure 22:
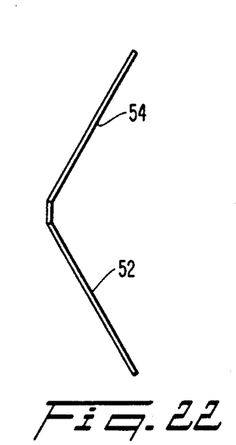
FIG. 22 is left side view of the strip of connected shutters according to the embodiment illustrated in FIG. 21.

In a further embodiment shown in FIG. 21, the shutters 30 are stamped in the die so that upon exit from the die, the shutters 30 form a band of connected shutters. Each of the shutters 30 is partially folded as shown in FIG. 22. Each shutter 30 is connected to an adjacent shutter 30 by a strip 140 of connecting material. The strip 140 of connecting material connects one of the second sides 78 of the intermediate portion 56 of the one shutter 30 to one of the second sides 80 of the intermediate portion 56 of the adjacent shutter 30.

After forming the band of connected shutters 30, the band can be coil wound to result in a wound roll of connected shutters. Paper or other protective material can be placed between adjoining layers of the band of connected shutters in order to prevent the shutters from contacting and damaging each other. Once the band of connected shutters has been wound, the wound roll can be packaged for shipment.

Figure 23:
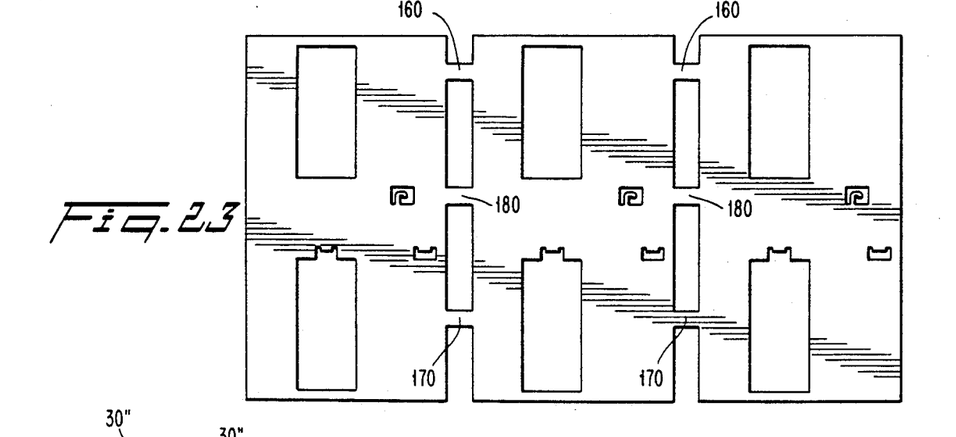
FIG. 23 is a top view of a strip of connected shutters after manufacturing according to another embodiment of the present invention.

In a still futher embodiment shown in FIG. 23, the shutters 30 are stamped in the die and upon exiting the die, the shutters are in an unfoled, flat configuration, similar to that shown in FIG. 5. Adjacent shutters 30 are connected to one another by a plurality of strips 160, 170, 180 of connecting material to form a band of connected shutters. One strip of connecting material 160 connects one of the second sides 62 of the first portion 52 of one shutter 30 to one of the second sides 64 of the first portion 52 of an adjacent shutter 30. A second strip of material 170 connects one of the second sides 70 of the second portion 54 of the one shutter 30 to one of the second sides 72 of the second portion 54 of the adjacent shutter 30. A third strip 180 of material connects one of the second sides 78 of the intermediate portion 56 of the one shutter 30 to one of the second sides 80 of the intermediate portion 56 of the adjacent shutter. The band of connected shutters 30 depicted in FIG. 23 can be coil wound in the flat configuration in order to form a wound roll of flat shutters. Paper or other protective material can be placed between adjacent layers of the shutters to protect the shutters from damage due to contact. The wound roll of connected shutters can then be packaged for shipment.

Figure 24:
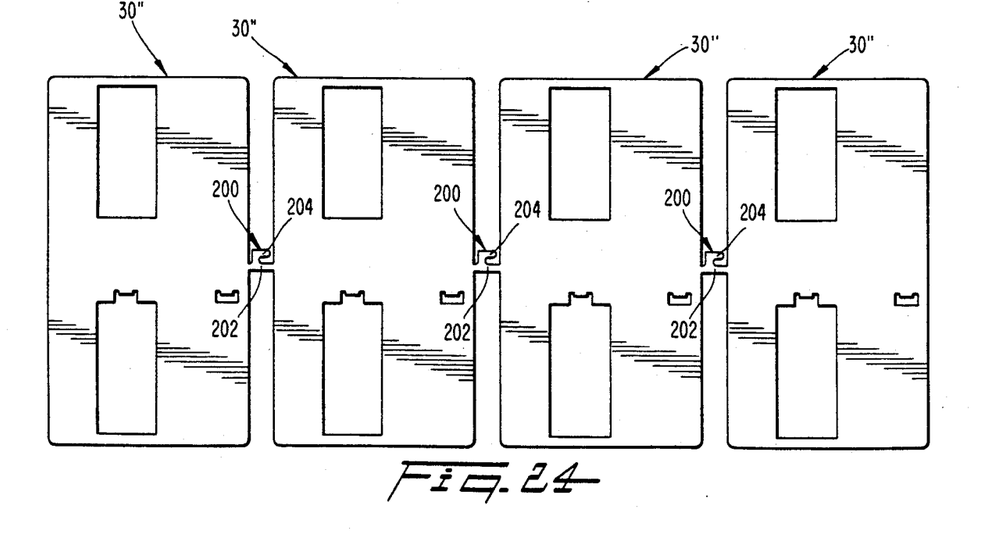
FIG. 24 is a top view of a strip of connected shutters after manufacturing according to another embodiment of the present invention.

FIG. 24 illustrates the manner in which the shutters 30" shown in FIGS. 11–14 are manufactured as a band of connected shutters. Adjacent shutters 30" are connected to one another by the arrangement 200 that is used for seating the spring member 210. In particular, when the shutters exit the die, the flange 202 that is integrally connected to the intermediate portion 56 is also connected to the adjacent shutter 30". That connecting arrangement is quite advantageous because the need for removing the piece of connecting material prior to placing the shutter on the protective case 24 is eliminated. As in the embodiment depicted in FIG. 23, the band of connected shutters shown in FIG. 24 can be coil wound to form a wound roll of shutters. Protective paper or other material can be placed between adjacent layers of the shutters in the wound roll.

In each of the embodiments described above, the connected shutters can be easily unwound from their wound configurations when shutters are needed for assembling flexible disk cartridges. Further, the connected shutters can be easily disconnected from one another through use of a machine or by simply bending the shutters at the point where the strips of connecting material are connected to the sides of the shutters. Preferably, a score line is marked where the shutters are connected to the strips of connecting material in order to facilitate disconnection of the shutters from one another as well as removal of the connecting strips from the shutters.

In the embodiments illustrated in FIGS. 17-20, the shutters are folded prior to being wound in a roll and thus, when the band of connected shutters are unwound and the individual shutters are disconnected from one another, the shutters will be ready for attachment to the protective case 24 of the flexible disk cartridge 20. In the of the embodiment illustrated in FIGS. 21 and 22, when the connected shutters are unwound and detached from one another, the shutters will be partially folded and thus, will require further folding before they can be attached to the protective case 24 of the flexible disk cartridge 20. Finally, with respect to the embodiments shown in FIGS. 23 and 24, the shutters will be in a flat configuration after they are unwound and detached from each other and consequently, they will have to be subjected to a complete folding step prior to placement on the protective case 24 of the flexible disk cartridge 20.

The above-described method of manufacturing shutters prevents the shutters from becoming damaged as a result of contact with other shutters. The typical method for manufacturing shutters involves the manufacture of individual shutters which are placed in a package or container for shipping. Such packaging methods present the possibility that the shutters will be damaged due to repeated contact with one another in the package. In light of the manner in which packages are commonly handled, repeated contact amongst the shutters in the package is almost certain to occur.

Thus, the manner in which the shutters of the present invention are manufactured as a band of connected shutters that are wound in a roll avoids the possibility of damage due to contact. The edges of the shutters and any coating on the shutters will thus remain intact, regardless of the package handling methods employed during shipment and other movement of the packages. Furthermore, when the time comes to assemble the flexible disk cartridges by placing the shutter on the protective case 24, the assembler can very easily unwind the shutters and separate them from one another.

The principles, preferred embodiments and modes of operation of the present invention have been described in the foregoing specification. However, the invention which is intended to be protected is not to be constructed as limted to the particular embodiments disclosed. Further, the embodiments described herein are to be regarded as illustrative rather than restrictive. Variations and changes may be made by others without departing from the spirit of the present invention. Accordingly, it is expressly intended that all such variations and changes which fall within the spirit and scope of the present invention as defined in the claims, be embraced thereby.

What is claimed is:

1. A shutter for covering a head window opening in a protective case that encases a flexible disk comprising: a strip member having a first substantially rectangular portion, a second substantially rectangular portion and an intermediate portion connecting said first and second portions, said first portion having a substantially rectangular opening located therein that is defined by two oppositely positioned first sides and two oppositely positioned second sides, said second portion having a substantially rectangular opening located therein that is defined by two oppositely positioned first sides and two oppositely positioned second sides, one of the first sides of the opening in the first portion being substantially coplanar with one of the first sides of the opening in the second portion and the other first side of the opening in the first portion being substantially coplanar with the other first side of the opening in the second portion, the length of the first portion, second portion and intermediate portion in a direction perpendicular to the first sides of the openings being equal to or less than 1.630 inches.

2. The shutter according to claim 1, wherein the length of the first portion, second portion and intermediate portion in a direction perpendicular to the first sides of the openings is approximately 1.530 inches.

3. The shutter according to claim 1, wherein the thickness of the material is between 0.005 inches and 0.007 inches.

4. The shutter according to claim 3, wherein the thickness of the material is approximately 0.006 inches.

5. The shutter according to claim 1, wherein the material is stainless steel.

6. The shutter according to claim 1, wherein the material is plated brass.

7. The shutter according to claim 1, wherein the material is pre-plated steel.

8. The shutter according to claim 1, wherein the material is copper-based material.

9. The shutter according to claim 1, wherein the material is aluminum material.

10. The shutter according to claim 1, wherein said first and second portions are substantially parallel to one another and lie in different planes, the opening in the first portion being aligned with the opening in the second portion.

11. The shutter according to claim 1, wherein the first portion includes two oppositely positioned edges that are substantially parallel to the first sides of the opening in the first portion, the opening in the first portion being located closer to one of said edges of the first portion than the other said edge of the first portion.

12. The shutter according to claim 1, including seating means integrally formed with and extending from a peripheral edge of said intermediate portion for seating an elongated spring element which is adapted to bias the shutter in a closed position with respect to the head window opening when the shutter is mounted on the protective case.

13. The shutter according to claim 12, wherein said seating means includes a flange integrally formed with the peripheral edge of said intermediate portion and a substantially L-shaped tab integrally formed with and extending from the flange.

14. The shutter according to claim 12, including an elongated substantially flat spring member that is capable of being flexed along its length, said spring member having a first end that includes first mounting means for mounting the first end of the spring member in said seating means, and a second end that includes second mounting means for mounting the second end of the spring member in a seat located interiorly of the protective case.

15. The shutter according to claim 14, wherein said first mounting means includes a substantially V-shaped notch formed in the first end of the spring member, and said second mounting means includes peripheral sides of said spring member being tapered inwardly towards one another to define a pointed, substantially V-shaped second end of the spring member.

* * * * *